United States Patent
Attenberg et al.

(10) Patent No.: US 8,732,017 B2
(45) Date of Patent: May 20, 2014

(54) METHODS, SYSTEMS, AND MEDIA FOR APPLYING SCORES AND RATINGS TO WEB PAGES, WEB SITES, AND CONTENT FOR SAFE AND EFFECTIVE ONLINE ADVERTISING

(75) Inventors: Joshua M. Attenberg, Roxbury, CT (US); Foster J. Provost, New York, NY (US)

(73) Assignee: Integral Ad Science, Inc., New York, NY (US)

( * ) Notice: Subject to any disclaimer, the term of this patent is extended or adjusted under 35 U.S.C. 154(b) by 290 days.

(21) Appl. No.: 13/151,146

(22) Filed: Jun. 1, 2011

(65) Prior Publication Data

US 2012/0010927 A1   Jan. 12, 2012

Related U.S. Application Data

(60) Provisional application No. 61/350,393, filed on Jun. 1, 2010, provisional application No. 61/431,789, filed on Jan. 11, 2011.

(51) Int. Cl.
*G06Q 30/00* (2012.01)
*G06Q 30/02* (2012.01)

(52) U.S. Cl.
CPC ........ *G06Q 30/0263* (2013.01); *G06Q 30/0277* (2013.01)
USPC ...................................... 705/14.6; 705/14.73

(58) Field of Classification Search
CPC ................. G06Q 30/0263; G06Q 30/0277
USPC ............................................ 705/14.6, 14.73
See application file for complete search history.

(56) References Cited

U.S. PATENT DOCUMENTS

| | | | |
|---|---|---|---|
| 6,643,641 B1 | 11/2003 | Snyder | |
| 2002/0107735 A1* | 8/2002 | Henkin et al. | 705/14 |
| 2003/0236721 A1 | 12/2003 | Plumer et al. | |
| 2005/0246410 A1* | 11/2005 | Chen et al. | 709/200 |
| 2007/0005417 A1* | 1/2007 | Desikan et al. | 705/14 |
| 2007/0033531 A1* | 2/2007 | Marsh | 715/738 |
| 2008/0209552 A1* | 8/2008 | Williams et al. | 726/22 |

OTHER PUBLICATIONS

Attenberg, J., et al., "Collaborative Email-Spam Filtering with the Hashing Trick", In the Proceedings of the Sixth Conference on Email and Anti-Spam (CEAS '09), Mountain View, CA, US, Jul. 16-17, 2009, pp. 1-4.

(Continued)

*Primary Examiner* — Scott D Gartland
(74) *Attorney, Agent, or Firm* — Byrne Poh LLP

(57) ABSTRACT

Systems, methods, and media for rating websites for safe advertising are provided. In accordance with some embodiments of the disclosed subject matter, the method comprises: extracting one or more features from a piece of web content; applying a plurality of statistical models to the extracted features to generate a plurality of ordinomial estimates, wherein each ordinomial estimate represents a probability that the web content is a member of one of a plurality of severity groups; determining a posterior ordinomial estimate for the web content by combining the plurality of ordinomial estimates; generating a risk rating that encodes severity and confidence based on the determined posterior ordinomial estimate, wherein the risk rating identifies whether the web content is likely to contain objectionable content of a given category; and providing the risk rating for determining whether an advertisement should be associated with the web content.

21 Claims, 14 Drawing Sheets

(56) References Cited

OTHER PUBLICATIONS

Fawcett, T., "Knowledge-Based Feature Discovery for Evaluation Functions", In Computional Intelligence, vol. 12, No. 1, Feb. 1996, pp. 42-64.

Macskassy, S., and Provost, F., "Classification in Networked Data: A Toolkit and a Univariate Case Study", In Journal of Machine Learning Research, vol. 8, May 2007, pp. 935-983.

Melville, M., et al., "An Expected Utility Approach to Active Feature-Value Acquisition", In the Proceeding of the Fifth IEEE International Conference on Data Mining (ICDM '05), Houston, TX, US, Nov. 27-30, 2005, pp. 1-4.

Neville, J., and Provost, F., "Tutorial on Predictive Modeling with Social Networks", In the Proceedings of the International Conference on Knowledge Discovery and Data Mining (KDD '08), Las Vegas, NV, US, Aug. 24-27, 2008, pp. 1-71.

Provost, F., et al., "Data Acquisition and Cost-Effective Predicitive Modeling: Targeting Offers for Electronic Commerce", In the Proceedings of the Ninth International Conference (ICEC '07), Minneapolis, MN, US, Aug. 19-22, 2007, pp. 1-10.

Saar, M., et al., "Active Feature-Value Acquisition", In Management Science, vol. 55, No. 4, Apr. 2009, pp. 1-4.

Sheng, V. S., et al., "Get Another Label? Improving Data Quality and Data Mining Using Multiple, Noisy Labelers", In the Proceedings of the 14th ACM SIGKDD International Conference on Knowledge Discovery and Data Mining, (SIGKDD '08), Las Vegas, NV, US, Aug. 24-27, 2008, pp. 1-9.

Weinberger, K., et al., "Feature Hasing for Large Scale Multitask Learning", In the Proceedings of the 26th International Conference on Machine Learning (IMCL '09), Montreal, CA, Jun. 14-18, 2009, pp. 1-8.

Office Action dated Aug. 22, 2012 in U.S. Appl. No. 12/859,763.
Office Action dated May 17, 2013 in U.S. Appl. No. 12/859,763.

* cited by examiner

500

510 — SELECTING THE WORST SEVERITY GROUPS FROM AN OBJECTIONABLE CATEGORY IN ACCORDANCE WITH A USER SPECIFIED CONFIDENCE PARAMETER ($\beta$), WHERE THE BIN ($b_i$) THAT THE CONFIDENCE PARAMETER IS REACHED CAN BE REPRESENTED BY:

$$b_i = \arg\min_i \sum_{j=1}^{i} p(y = b_j | x) \leq \beta$$

520 — GENERATING ONE OR MORE RATINGS FROM THE ORDINOMIAL PROBABILITY ESTIMATES DETERMINED FOR A GIVEN PAGE FOR THE SELECTED BIN ($b_i$), WHERE THE RATING CAN BE REPRESENTED BY:

$$\mathcal{R}_x = c_i - (c_i - s_{i-1})\frac{\sum_{j=0}^{i-1} p(y = b_j | x)}{\beta} + (s_i - c_i)\frac{\sum_{j=i+1}^{n} p(y = b_j | x)}{1 - \beta}$$

METHODS, SYSTEMS, AND MEDIA FOR APPLYING SCORES AND RATINGS TO WEB PAGES, WEB SITES, AND CONTENT FOR SAFE AND EFFECTIVE ONLINE ADVERTISING

CROSS-REFERENCE TO RELATED APPLICATIONS

This application claims the benefit of U.S. Provisional Patent Application No. 61/350,393, filed Jun. 1, 2010 and U.S. Provisional Patent Application No. 61/431,789, filed Jan. 11, 2011, which are hereby incorporated by reference herein in their entireties.

This application is also related to U.S. patent application Ser. No. 12/859,763, filed Aug. 19, 2010, which is hereby incorporated by reference herein in its entirety.

FIELD OF THE INVENTION

The disclosed subject matter generally relates to methods, systems, and media for applying scores and ratings to web pages, web sites, and other pieces of content of interest to advertisers or content providers for safe and effective online advertising.

BACKGROUND OF THE INVENTION

Brands are carefully crafted and incorporate a firm's image as well as a promise to the firm's stakeholders. Unfortunately, in the current online environment, advertising networks may juxtapose advertisements that represent such brands with undesirable content due to the opacity of the ad-placement process and possibly to a misalignment of incentives in the ad-serving ecosystem. Currently, neither the ad network nor the brand can efficiently recognize whether a website contains or has a tendency to contain questionable content.

Online advertisers use tools that provide information about websites or publishers and the viewers of such websites to facilitate more effective planning and management of online advertising by advertisers. Moreover, online advertisers continually desire increased control over the web pages on which their advertisements and brand messages appear. For example, particular online advertisers want to control the risk that their advertisements and brand messages appear on pages or sites that contain objectionable content (e.g., pornography or adult content, hate speech, bombs, guns, ammunition, alcohol, offensive language, tobacco, spyware, malicious code, illegal drugs, music downloading, particular types of entertainment, illegality, obscenity, etc.). In another example, advertisers for adult-oriented products, such as alcohol and tobacco, want to avoid pages directed towards children. In yet another example, particular online advertisers want to increase the probability that their content appears on specific sorts of sites (e.g., websites containing news-related information, websites containing entertainment-related information, etc.). However, current advertising tools merely categorize websites into categories indicating that a web site contains a certain sort of content.

There is therefore a need in the art for approaches for applying scores and ratings to web pages, web sites, and content for safe and effective online advertising. Accordingly, it is desirable to provide methods, systems, and media that overcome these and other deficiencies of the prior art.

For example, the disclosed subject matter provides advertisers, agencies, advertisement networks, advertisement exchanges, and publishers with the ability to make risk-controlled decisions based on the category-specific risk and/or general risk associated with a given web page, website, etc. In a more particular example, advertisers, agencies, advertisement networks, advertisement exchanges, and publishers can determine whether to place a particular advertisement on a particular web page based on a high confidence that the page does not contain objectionable content. In another more particular example, advertisers, agencies, advertisement networks, advertisement exchanges, and publishers can request to view a list of pages in their current advertisement network traffic assessed to have the highest risk of objectionable content.

SUMMARY OF THE INVENTION

In accordance with various embodiments of the disclosed subject matter, mechanisms for scoring and rating web pages, web sites, and other pieces of content of interest to advertisers or content providers for safe and effective online advertising are provided.

These mechanisms, among other things, generate a risk rating that accounts for the inclusion of objectionable content with the use of ordinomials. The risk rating can, in some embodiments, represent the probability that a page or a site contains or will contain objectionable content, the degree of objectionability of the content, and/or any suitable combination thereof. In a more particular example, the risk rating can be determined for a single domain and/or a single category such that a particular piece of media or content can have a rating for each of a number of objectionable content categories. Alternatively, in another more particular example, the risk rating can be determined across several objectionable content categories, across multiple pieces of content (e.g., the pages appearing in the advertiser's traffic), and/or across multiple domains managed by a publisher.

In some embodiments, these mechanisms can be generated using multiple statistical models and considering multiple pieces of evidence. In some embodiments, these mechanisms can account for temporal dynamics in content by determining a risk rating that is based on the probability of encountering different severity levels from a given URL and that is based on the types of estimated severity exhibited in the past.

In some embodiments, these mechanisms can evaluate the quality of collections of content. More particularly, these mechanisms can collect individual content ratings (e.g., ordinal ratings and/or real-valued ratings), aggregate these ratings across arbitrary subsets, normalize these ordinal and real-valued ratings onto a general index scale, and calibrate and/or map the normalized ratings using a global mean to provide a benchmark for comparison. This mapping can capture the risk and/or severity profiles of appearance of content.

Systems, methods, and media for rating websites for safe advertising are provided. In accordance with some embodiments of the disclosed subject matter, the method comprises: extracting one or more features from a piece of web content; applying a plurality of statistical models to the extracted features to generate a plurality of ordinomial estimates, wherein each ordinomial estimate represents a probability that the web content is a member of one of a plurality of severity groups; determining a posterior ordinomial estimate for the web content by combining the plurality of ordinomial estimates; generating a risk rating that encodes severity and confidence based on the determined posterior ordinomial estimate, wherein the risk rating identifies whether the web content is likely to contain objectionable content of a given category; and providing the risk rating for determining whether an advertisement should be associated with the web content.

In some embodiments, the method further comprises: determining a plurality of posterior ordinomial estimates at a plurality of times for the web content; and determining an expected posterior ordinomial estimate by combining the plurality of posterior ordinomial estimates over the plurality of times.

In some embodiments, the method further comprises: extracting a uniform resource locator from the one or more features; assembling a first set of posterior ordinomial estimates from the plurality of posterior ordinomial estimates based on the uniform resource locator; and determining the expected posterior ordinomial estimate by combining the first set of posterior ordinomial estimates over the plurality of times.

In some embodiments, the method further comprises: determining that the web content belongs to a sitelet, wherein the sitelet includes a plurality of web pages; determining a sitelet ordinomial by aggregating the plurality of posterior ordinomial estimates associated with each of the plurality of web pages; and generating a sitelet rating based on the aggregated plurality of posterior ordinomials.

In some embodiments, the method further comprises: comparing the sitelet ordinomial with the plurality of posterior ordinomial estimates associated with each of the plurality of web pages belonging to the sitelet; and determining whether to store at least one of the sitelet ordinomial and the plurality of posterior ordinomial estimates based on the comparison and a sensitivity value.

In some embodiments, the method further comprises: collecting a plurality of ratings associated with a plurality of pieces of web content, wherein the plurality of ratings includes ordinal ratings and real-valued ratings; and determining an aggregate rating for the plurality of pieces of web content based on the collected plurality of ratings.

In some embodiments, the method further comprises normalizing the aggregate rating by mapping the aggregate rating to an index-scaled rating.

In some embodiments, the method further comprises: applying a severity weight to the index-scaled rating; and generating a severity-weighted index-scaled rating for the plurality of pieces of web content.

In some embodiments, the method further comprises generating a combined risk rating by combining the generated risk rating that encodes whether the web content is likely to contain objectionable content of the given category with a second risk rating that encodes whether the web content is likely to contain objectionable content of a second category.

In some embodiments, a system for rating webpages for safe advertising is provided, the system comprising a processor that: extracts one or more features from a piece of web content; applies a plurality of statistical models to the extracted features to generate a plurality of ordinomial estimates, wherein each ordinomial estimate represents a probability that the web content is a member of one of a plurality of severity groups; determines a posterior ordinomial estimate for the web content by combining the plurality of ordinomial estimates; generates a risk rating that encodes severity and confidence based on the determined posterior ordinomial estimate, wherein the risk rating identifies whether the web content is likely to contain objectionable content of a given category; and provides the risk rating for determining whether an advertisement should be associated with the web content.

In some embodiments, a non-transitory computer-readable medium containing computer-executable instructions that, when executed by a processor, cause the processor to perform a method for rating webpages for safe advertising, the method comprising: extracting one or more features from a piece of web content; applying a plurality of statistical models to the extracted features to generate a plurality of ordinomial estimates, wherein each ordinomial estimate represents a probability that the web content is a member of one of a plurality of severity groups; determining a posterior ordinomial estimate for the web content by combining the plurality of ordinomial estimates; generating a risk rating that encodes severity and confidence based on the determined posterior ordinomial estimate, wherein the risk rating identifies whether the web content is likely to contain objectionable content of a given category; and providing the risk rating for determining whether an advertisement should be associated with the web content.

BRIEF DESCRIPTION OF THE DRAWINGS

Various objects, features, and advantages of the disclosed subject matter can be more fully appreciated with reference to the following detailed description of the invention when considered in connection with the following drawing, in which like reference numerals identify like elements.

FIG. 5 is a diagram of an illustrative example of a process for generating one or more ratings for a webpage in accordance with some embodiments of the disclosed subject matter.

DETAILED DESCRIPTION OF THE INVENTION

Figure 1:
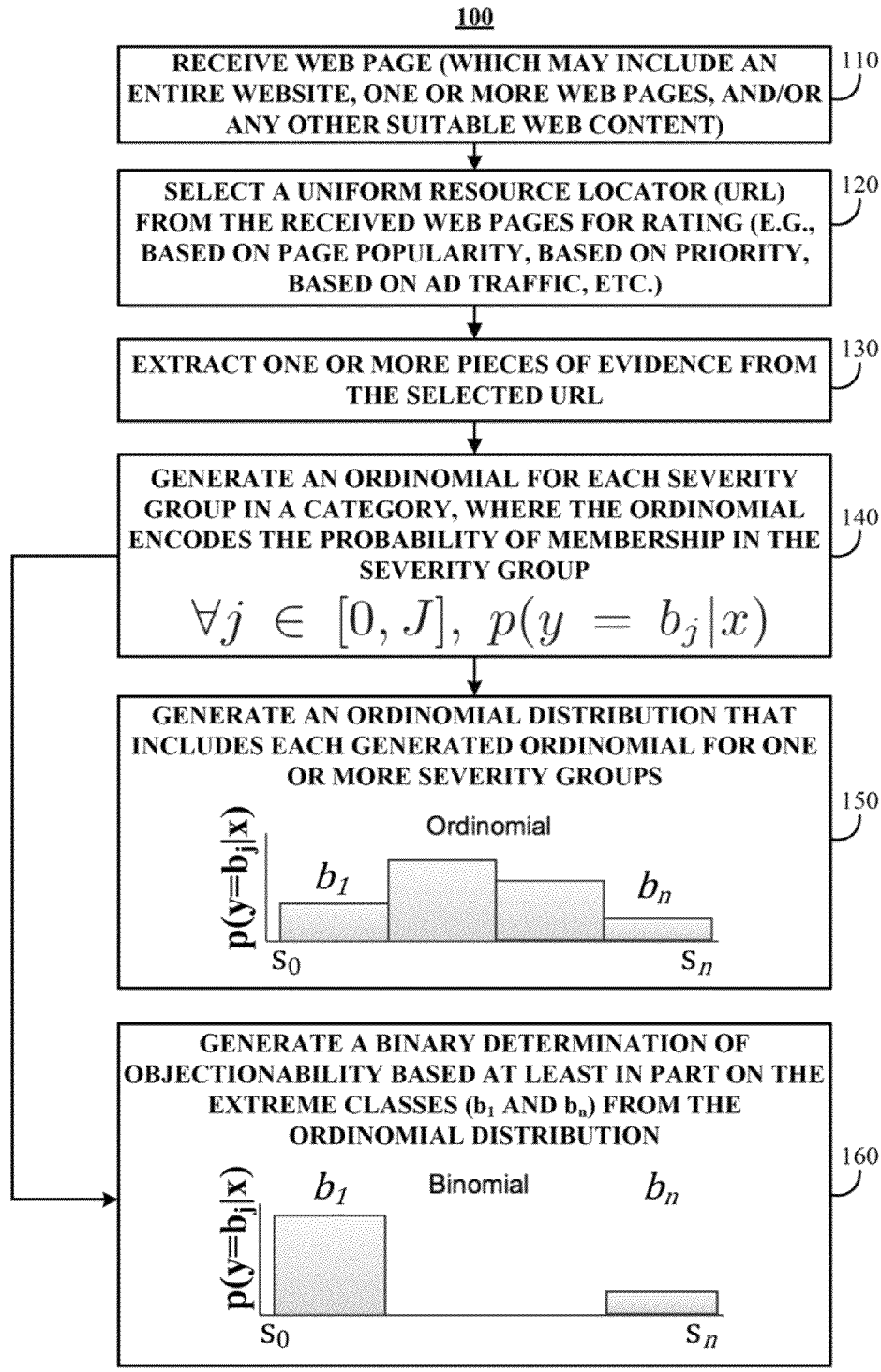
FIG. 1 is a diagram of an illustrative example of a process for determining the probability of membership in a severity group for a category of objectionable content in accordance with some embodiments of the disclosed subject matter.

In accordance with some embodiments of the disclosed subject matter, mechanisms for scoring and rating web pages, web sites, and other pieces of content of interest to advertisers or content providers for safe and effective online advertising are provided. These mechanisms, among other things, generate a risk rating that accounts for the inclusion of objectionable content with the use of ordinomials. The risk rating can, in some embodiments, represent the probability that a page or a site contains or will contain objectionable content, the degree of objectionability of the content, and/or any suitable combination thereof. In a more particular example, the risk rating can be determined for a single domain and/or a single category such that a particular piece of media or content can have a rating for each of a number of objectionable content categories. Alternatively, in another more particular example, the risk rating can be determined across several objectionable content categories, across multiple pieces of content (e.g., the pages appearing in the advertiser's traffic), and/or across multiple domains managed by a publisher.

In some embodiments, these mechanisms can be generated using multiple statistical models and considering multiple pieces of evidence. In some embodiments, these mechanisms can account for temporal dynamics in content by determining a risk rating that is based on the probability of encountering different severity levels from a given URL and that is based on the types of estimated severity exhibited in the past.

These mechanisms can be used in a variety of applications. For example, these mechanisms can provide a rating application that allows advertisers, ad networks, publishers, site managers, and/or other entities to make risk-controlled decisions based at least in part on risk associated with a given webpage, website, or any other suitable content (generally referred to herein as a "webpage" or "page"). In another example, these mechanisms can be provide a rating application that allows advertisers, agencies, advertisement networks, advertisement exchanges, and/or publishers to determine whether to place a particular advertisement on a particular web page based on a high confidence that the page does not contain objectionable content. In a more particular example, these mechanisms allow an advertiser to designate that an advertisement should not be placed on a web page unless a particular confidence (e.g., high confidence, medium-high confidence, etc.) is achieved. In such an example, the particular confidence may be determined based on having a severity greater than a particular severity group in a particular category. In another example, advertisers, agencies, advertisement networks, advertisement exchanges, and publishers can request to view a list of pages in their current advertisement network traffic assessed to have the highest risk of objectionable content.

It should be noted that there can be several categories of objectionable content that may be of interest. For example, these categories can include content that relates to guns, bombs, and/or ammunition (e.g., sites that describe or provide information on weapons including guns, rifles, bombs, and ammunition, sites that display and/or discuss how to obtain weapons, manufacture of weapons, trading of weapons (whether legal or illegal), sites which describes or offer for sale weapons including guns, ammunition, and/or firearm accessories, etc.). In another example, these categories can include content relating to alcohol (e.g., sites that provide information relating to alcohol, sites that provide recipes for mixing drinks, sites that provide reviews and locations for bars, etc.), drugs (e.g., sites that provide instructions for or information about obtaining, manufacturing, or using illegal drugs), and/or tobacco (e.g., sites that provide information relating to smoking, cigarettes, chewing tobacco, pipes, etc.). In yet another example, these categories can include offensive language (e.g., sites that contain swear words, profanity, hard language, inappropriate phrases and/or expressions), hate speech (e.g., sites that advocate hostility or aggression towards individuals or groups on the basis of race, religion, gender, nationality, or ethnic origin, sites that denigrate others or justifies inequality, sites that purport to use scientific or other approaches to justify aggression, hostility, or denigration), and/or obscenities (e.g., sites that display graphic violence, the infliction of pain, gross violence, and/or other types of excessive violence). In another example, these categories can include adult content (e.g., sites that contain nudity, sex, use of sexual language, sexual references, sexual images, and/or sexual themes). In another example, these categories can include spyware or malicious code (e.g., sites that provide instructions to practice illegal or unauthorized acts of computer crime using technology or computer programming skills, sites that contain malicious code, etc.) or other illegal content (e.g., sites that provide instructions for threatening or violating the security of property or the privacy of others, such as theft-related sites, locking picking and burglary-related sites, fraud-related sites).

It should be noted that objectionable content on one or more of these webpages can generally be defined as having a severity level worse than (or greater than) $b_i$ in a category y. Each category (y) can include various severity groups $b_j$, where j is greater than or equal to 1 through n and n is an integer greater than one. For example, an adult content category can have various severity levels, such as G, PG-13, PG, R, NC-17, and X. In another example, an adult content category and an offensive speech category can be combined to form one category of interest. In yet another example, unlike the adult content category example, a category may not have fine grained severity groups and a binomial distribution can be used. For example, a binomial probability can be used for binary outcome events, where there is typically one positive event (e.g., good, yes, etc.) and one negative event (e.g., bad, no, etc.).

FIG. 1 is a diagram showing an example of a process for determining the probability of membership in a severity group for one or more category of objectionable content in accordance with some embodiments of the disclosed subject matter. As shown in FIG. 1, process 100 begins by receiving or reviewing content on a webpage, website, or any other suitable content (generally referred to herein as a "webpage" or "page") at 110. For example, in some embodiments, a rating application can receive multiple requests to rate a group of webpages or websites. In another example, a rating application can receive, from an advertiser, a list of websites that the advertiser is interested in placing an advertisement provided that each of these websites does not contain or does not have a high likelihood of containing objectionable content. In yet another example, a rating application can receive, from an advertiser, that advertiser's current advertisement network traffic for assessment.

In response to receiving one or more webpages, the rating application or a component of the rating application selects a uniform resource locator (URL) for rating at 120. In another example, the rating application can receive one or more requests from other components (e.g., the most popular requests are assigned a higher priority, particular components of the rating application are assigned a higher priority, or random selection from the requests). In yet another example, a fixed, prioritized list of URLs can be defined based, for example, on ad traffic or any other suitable input (e.g., use of the rating for scoring, use of the rating for active learning, etc.).

One or more pieces of evidence can be extracted from the uniform resource locator or page at 130. These pieces of evidence can include, for example, the text of the URL, image analysis, HyperText Markup Language (HTML) source code, site or domain registration information, ratings, categories, and/or labeling from partner or third party analysis systems (e.g., site content categories), source information of the images on the page, page text or any other suitable semantic analysis of the page content, metadata associated with the page, anchor text on other pages that point to the page of interest, ad network links and advertiser information taken from a page, hyperlink information, malicious code and spyware databases, site traffic volume data, micro-outsourced data, any suitable auxiliary derived information (e.g., ad-to-content ratio), and/or any other suitable combination thereof. As described herein, evidence and/or any other suitable information relating to the page can be collected, extracted, and/or derived using one or more evidentiary sources.

Approaches for collecting and analyzing various pieces of evidence for generating a risk rating are further described in, for example, above-referenced U.S. patent application Ser. No. 12/859,763, filed Aug. 19, 2010, which is hereby incorporated by reference herein in its entirety.

To encode the probability of membership in severity group $b_j$, an ordinomial can be generated at 140. For example, a multi-severity classification can be determined by using an ordinomial to encode the probability of membership in an ordered set of one or more severity groups. The ordinomial can be represented as follows:

$$\forall j \in [0..J], p(y=b_j|x)$$

where y is a variable representing the severity class that page x belongs to. It should be noted that the ordinal nature implies that $b_i$ is less severe than $b_j$, when $i<j$. It should also be noted that ordinomial probabilities can be estimated using any suitable statistical models, such as the ones described herein, and using the evidence derived from the pages.

At 150, an ordinomial distribution that includes each generated ordinomial for one or more severity groups can be generated. Accordingly, the cumulative ordinal distribution F can be described as:

$$F(y=b_j|x)=\Sigma_{i=1}^{j} p(y=b_i|x)$$

Alternatively, unlike the adult content category example described above, a category may not have fine grained severity groups and a binomial distribution can be used. For example, a binomial probability can be used for binary outcome events, where there is typically one positive event (e.g., good, yes, etc.) and one negative event (e.g., bad, no, etc.). At 160, in some embodiments, a binary or binomial-probability determination of appropriateness or objectionability can be projected onto an ordinomial by considering the extreme classes—$b_1$ and $b_n$. For example, in cases where a large spectrum of severity groups may not be present, such as malware, a binomial determination can be performed, where the extreme classes include one positive class (e.g., malware is present in the content) and one negative class (e.g., malware is not present in the content). Ordinomial probabilities can be estimated using one or more statistical models, for example, from evidence derived or extracted from the received web pages.

It should be noted that, in process 100 of FIG. 1 and other processes described herein, some steps can be added, some steps may be omitted, the order of the steps may be rearranged, and/or some steps may be performed simultaneously.

Figure 2:
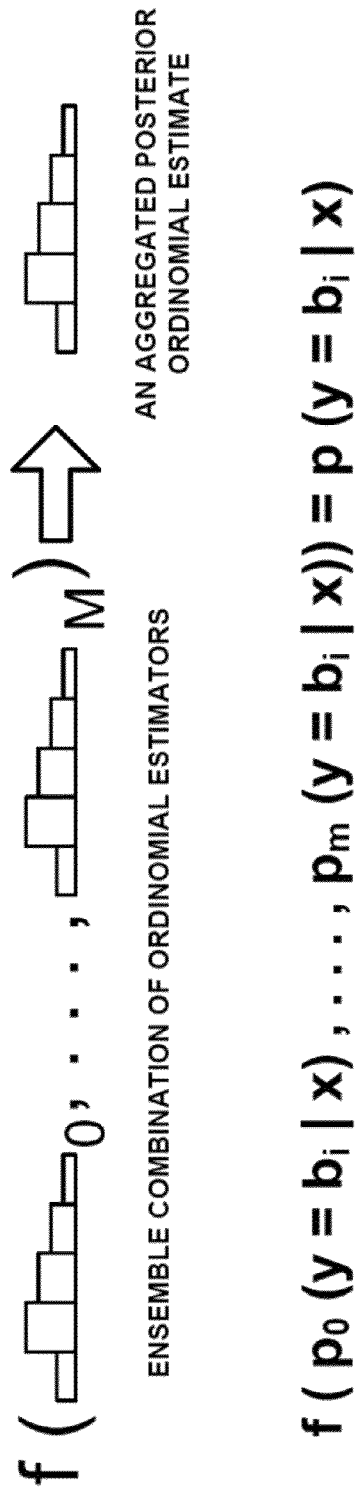
FIG. 2 is a diagram of an illustrative example of combining ordinomial estimates into a posterior ordinomial estimate in accordance with some embodiments of the disclosed subject matter.

In some embodiments, multiple ordinomials can be generated from a variety of different statistical models based on a diverse range of evidence. For example, different pieces of evidence can be accounted for in the determination of an ordinomials. These ordinomial estimates can be combined into a posterior ordinomial estimate using, for example, ensemble approaches and information fusion approaches. In a more particular example, example aggregation approaches include weighted averaging, AdaBoost-type mixing, or using sub-ordinomials as covariates in a secondary model. Accordingly, as shown in FIG. 2, this can be represented as:

$$p(y=b_i|x)=f(p_0(y=b_i|x))$$

for predictive models 1 through m.

It should also be noted that, as web pages change over time, the rating application can account for such temporal dynamics. With the dynamics of web pages, subsequent estimates of posterior ordinomials can provide different results. The rating application accounts for these temporal dynamics, where the output can be based on the probability of encountering different severity levels from a given URL based on the type of estimated severity exhibited in the past. Given $p(y=b_i|x)$, the estimated posterior ordinomials at time can be estimated using, for example, Bayesian combination, techniques of ensemble modeling, exponential discounting over time, conditional random fields, hidden Markov models, and/or any other techniques that explicitly account for time differences. More particularly, one suitable technique can provide various weights based on data age.

Figure 3:
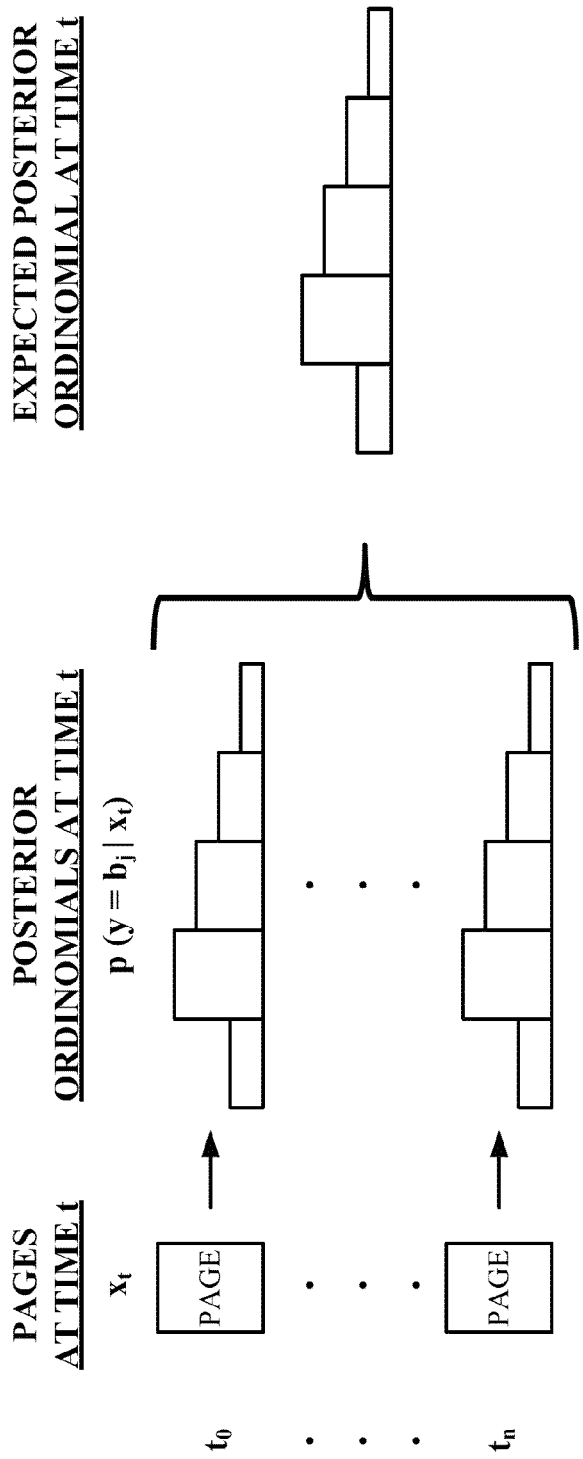
FIG. 3 is an illustrative example of temporal aggregation of posterior ordinomials in accordance with some embodiments of the disclosed subject matter.

In some embodiments, the rating application can provide temporal aggregation features to account for the change to web pages over time. FIG. 3 provides an illustrative example of temporal aggregation of posterior ordinomials in accordance with some embodiments of the disclosed subject matter. As shown, temporal aggregation can be implemented in an efficient and distributed manner using a map reduce paradigm, where the key of reduction is the URL being considered. The posterior ordinomials for all times (t) are aggregated and a final $p(y=b_i|x)$ is calculated using the aggregated ordinomials and output.

Figure 4:
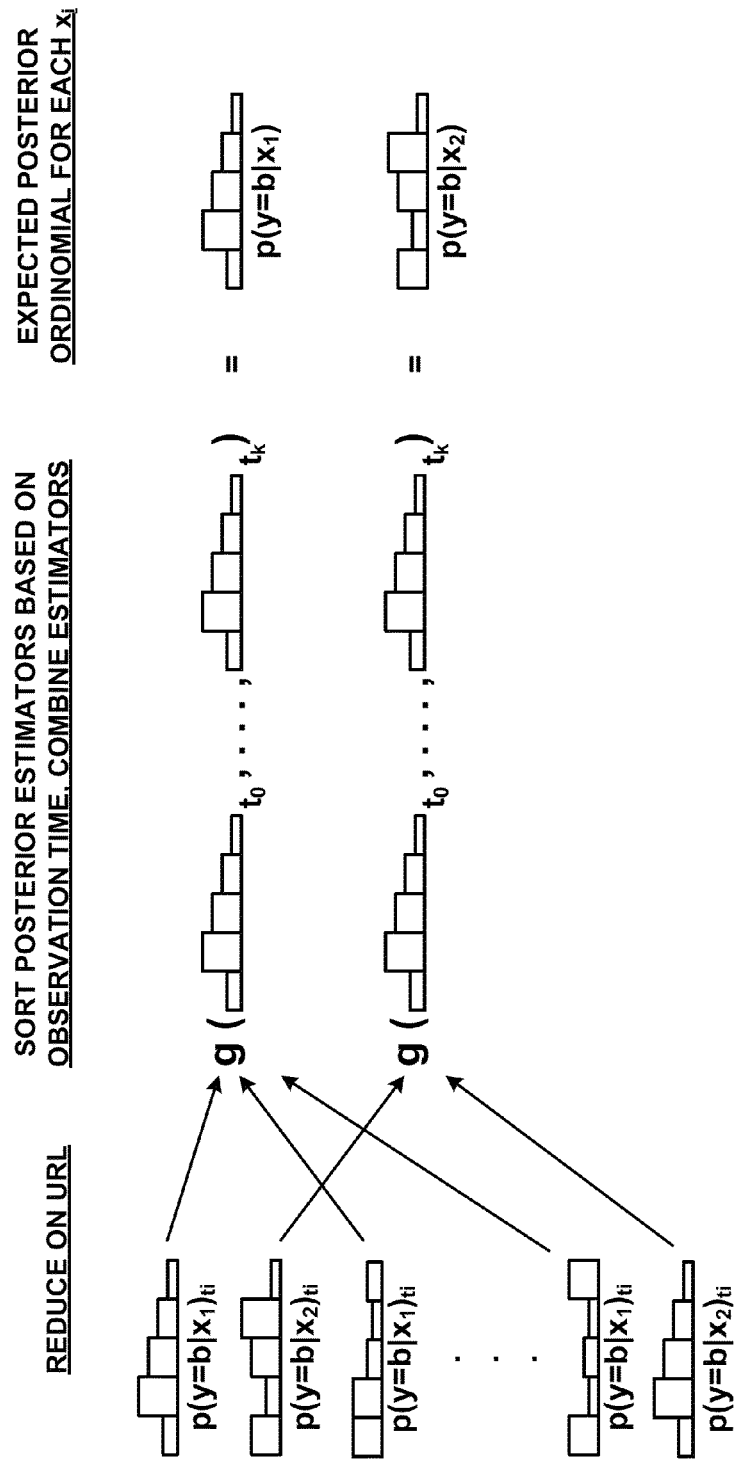
FIG. 4 is an illustrative example of the map reduction approach (MapReduce) for determining the temporal aggregation of posterior ordinomials in accordance with some embodiments of the disclosed subject matter.

FIG. 4 shows an illustrative example of the map reduction approach (MapReduce) for determining the temporal aggregation of posterior ordinomials in accordance with some embodiments of the disclosed subject matter. As shown, URLs can be used as the key for the reduction phase of the MapReduce process. This has the effect of compiling all samples that belong to a given domain onto a single computer during the reduction. Along with the URL, the ordinomials probabilities and the timestamp denoting the instant the ordinomials probability sample was made are passed. More particularly, as shown in FIG. 4, the posterior ordinomials for a given domain can be sorted based on the timestamp or observation time. Probability estimates can then be performed, where the sorted posterior ordinomials for a given domain are combined and an expected posterior ordinomials is calculated. Depending on the computational nature of the temporal aggregation, this expected ordinomial can be stored for use in future temporal aggregations, thereby alleviating the need for explicit storage of each individual record. Additionally, the reduction phase of this MapReduce process can compute and output a rating as described herein.

FIG. 5 is a diagram of an example of a process 500 for generating a rating (R) for a webpage in accordance with some embodiments of the disclosed subject matter. Generally speaking, one or more ratings can be determined for a webpage and its ordinomial probability estimates that encode both severity and confidence. That is, a rating (R) associated with a particular ordinomial, $p(y=b_j|x)$ that includes severity and confidence parameters is determined. For example, an advertiser may desire that the rating represents a particular confidence that the page's content is no worse than severity group $b_j$. Alternatively, in another example, an advertiser may desire that the rating encodes the confidence that a particular webpage is no better than a particular severity group.

Figure 6:
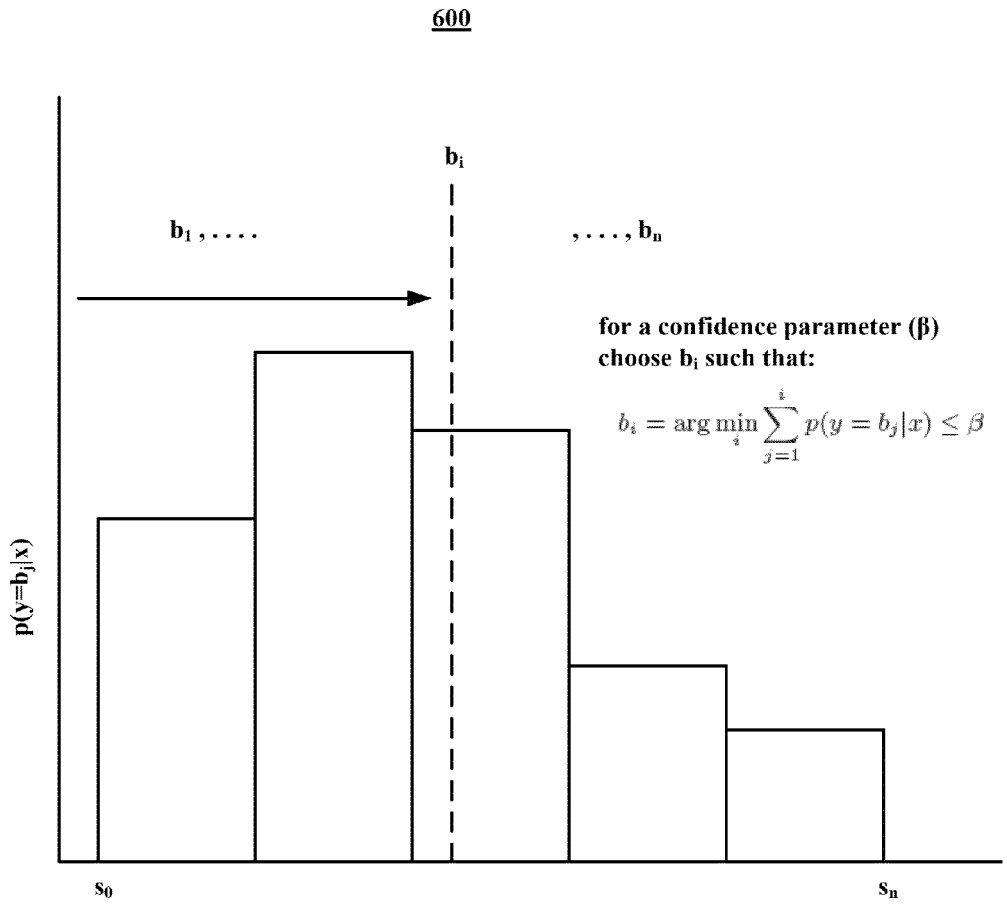
FIG. 6 is a diagram of a graph showing the selection of an appropriate bin ($b_i$) in an ordinomial given a confidence parameter ($\beta$) in accordance with some embodiments of the disclosed subject matter.

As shown in FIG. 5, process 500 begins by selecting the worst severity in accordance with a user specified confidence parameter ($\beta$) at 510. For example, as shown in FIG. 6, starting from the least severe or objectionable category in the ordinomial ($b_1$), the bins of the ordinomial are ascended, maintaining a sum of the probabilities encountered. The bin, $b_i$, where the level of confidence ($\beta$) is reached can be represented by:

$$b_i = \operatorname*{argmin}_{i} \sum_{j=1}^{i} p(y = b_j | x) \leq \beta$$

Accordingly, the bin, $b_i$, is selected such that the application has at least the level of confidence ($\beta$) that the content is no worse than $b_i$.

It should be noted that, when a larger confidence parameter ($\beta$) is assigned, a smaller probability mass resides in more severe categories is ensured.

Figure 7:
FIG. 7 is a diagram of an illustrative rating scale in accordance with some embodiments of the disclosed subject matter.

Referring back to FIG. 5, one or more ratings are generated at 520. The rating application can determine ratings from a given page's ordinomial probability estimates and encodes both severity and confidence. It should be noted that the rating application can assume that ratings are given on a numeric scale that can be divided into ranges $B_j$, where there is a one-to-one mapping between these ranges and the $b_j$. That is, step 510 of process 500 indicates that there is a particular confidence that a page has severity no worse than and the rating (R) is somewhere in the range $B_j$. For example, as shown in FIG. 7, the rating scale 700 can be a numeric scale of the numbers 0 through 1000, where 1000 denotes the least severe end or the highly safe portion of the scale. In another example, rating scale 700 can be further divided such that particular portions of rating scale are determined to be the best pages—e.g., ratings falling between 800 and 1000. Accordingly, if a greater than $\beta$ confidence that the page's content is no worse than the best category, then the page's rating falls in the 800-1000 range.

Additional features of the rating scale are described further below.

To determine the rating (R) within the range, boundaries to the rating range ($B_j$) and a center ($c_j$) of each bin are defined in the configuration of the application. For example, consider two pages A and B, where page A has 99.9% confidence that the page contains pornography and page B has a confidence of $(1-\beta)+\epsilon$ that it contains pornography. It should be noted that $\epsilon$ is generally an arbitrarily small number. That is, while page A contains pornography, it cannot be stated with confidence that page B does not contain pornography. Both pages A and B fall in the lowest ratings range. However, the rating application generates a significantly lower rating for page A.

It should be noted that, in some embodiments, interior rating ranges for a particular objectionability category can be defined. For example, the rating application can generate one or more ratings that take into account the difference between being uncertain between R rated content and PG rated content, where R and PG are two interior severity levels within the adult content category. In another example, the rating application can generate one or more ratings that take into account the difference between a page having no evidence of X rated content and a page having some small evidence of containing X rating content.

The boundaries of rating range $B_j$ can be defined as $s_{j-1}$ and $s_j$. In addition, a center $c_j$ can be defined for each bin. It should be noted that the center for each bin is not necessarily the median of the range. Rather, the center is the rating desired by the application should either all probability reside in this range, or should there be balanced probabilities above and below in accordance with a given level of $\beta$ assurance. Accordingly, the rating given the chosen bin, $b_i$, and the ordinomial encoding of $p(y=b_j|x)$ can be represented by:

$$\mathcal{R}_x = c_i - (c_i - s_{i-1}) \frac{\sum_{j=0}^{i-1} p(y=b_j|x)}{\beta} + (s_i - c_i) \frac{\sum_{j=i+1}^{n} p(y=b_j|x)}{1-\beta}$$

It should be noted that one or more ratings can be generated for one or more objectionable categories. For example, multiple ratings can be generated, where one rating is generated for each selected objectionable content category (e.g., adult content, offensive language, and alcohol).

It should also be noted that, in some embodiments, ratings for two or more objectionable categories can be combined to create a combined score. For example, a first rating generated for an adult content category and a second rating generated for an offensive language category can be combined. Alternatively, weights can be assigned to each category such that a higher weight can be assigned to the adult content category and a lower weight can be assigned to the offensive language category. Accordingly, an advertiser or any other suitable user of the rating application can customize the score by assigning weights to one or more categories. That is, a multi-dimensional rating vector can be created that represents, for each site, the distribution of risk of adjacency to objectionable content along different dimensions: guns, bombs and ammunition; alcohol; offensive language; hate speech, tobacco; spyware and malicious code; illegal drugs; adult content, gaming and gambling; entertainment; illegality; and/or obscenity.

Additionally or alternatively to generating a rating for a website or a webpage, the rating application can determine a rating for a sitelet. As used herein, a sitelet is a collection or subset of web pages and, more particularly, is often a topically homogeneous portion of a page, such as a topic-oriented subtree of a large site's hierarchical tree structure. For example, "finance.yahoo.com" can receive a rating as a sitelet of the website "yahoo.com."

It should be noted that the rating application can rate sitelets as there are web pages that the rating application has never seen before. However, that does not mean that the rating application has no evidence with which to rate the page. There is substantial rating locality within sitelets. A page from a risky site or sitelet is risky itself. In addition, the rating application can rate sitelets for computational storage efficiency as it may not be necessary to save or store the scores for individual pages if they are not significantly different from the scores for the sitelet. For example, if the ratings for the individual pages that make up website www.foo.com are within a given threshold value (e.g., a 5% difference), the rating application can store a rating for a sitelet (a collection of those individual pages). It should also be noted that sitelet scores can provide additional evidence to the rating computation even when the page has been seen before.

It should further be noted that advertising on a website can be an indication of direct financial support of the website. Even if a particular page does not contain objectionable content or is determined to not likely contain objectionable content, an advertiser may not want to support a site that otherwise promotes objectionable categories of content. For example, the rating application can provide an indication when a particular news item promotes or supports a major Nazi website. In another example, aside from the content of a page, the rating application can provide an indication when a particular advertiser that supports or advertises on a particular website falls in an objectionable category. In a more particular example, the rating application can detect whether the content falls within an objectionable category and whether advertisers, promoters, or other entities associated with the content fall within an objectionable category.

Figure 8:
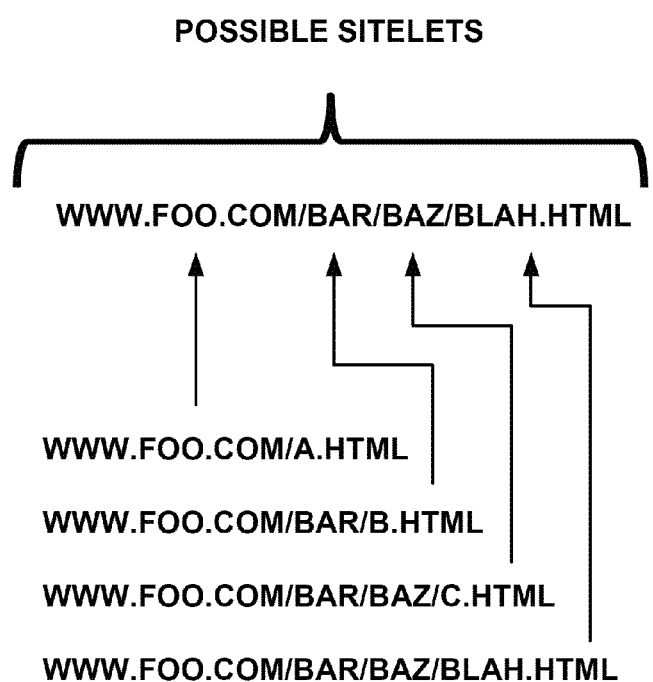
FIG. 8 is an illustrative example that incoming URLs can be matched to the sitelet with the longest available shared prefix in accordance with some embodiments of the disclosed subject matter.

In the example where sitelets are subtrees in the hierarchical site structure, FIG. 8 shows an illustrative example that incoming URLs can be matched to the sitelet with the longest available shared prefix. The aggregated ordinomials and associated rating of this longest prefix are then used for the query URL. Radix trees can, in some embodiments, be used to make this query computationally efficient.

It should be noted that a rating for every URL or sub-string in the file tree implied by a domain's URLs need not be stored explicitly. If the rating for a page or sub-tree is not significantly different from that of its parents, then explicit storage offers little additional benefit at the expense of increased storage and computation. Given a sensitivity parameter or threshold, $\tau$, that expresses the trade-off between sensitivity and storage, the rating application can store ratings for those components of the subtree with:

$$|\mathcal{R}(p) - \mathcal{R}(c)| \geq \tau$$

where R(•) denotes the rating for an entity, c denotes the child page or subtree whose rating is under consideration, and p denotes the parent of child page c.

Similar to individual pages, sitelet ratings can be generated from sitelet ordinomials. The sitelet ordinomials can be produced by an aggregation process over the pages in the sitelet. For example, the sitelet ordinomial can be a weighted combination of the page ordinomials, a Bayesian combination, or generated using any suitable explicit mathematical function.

Figure 9:
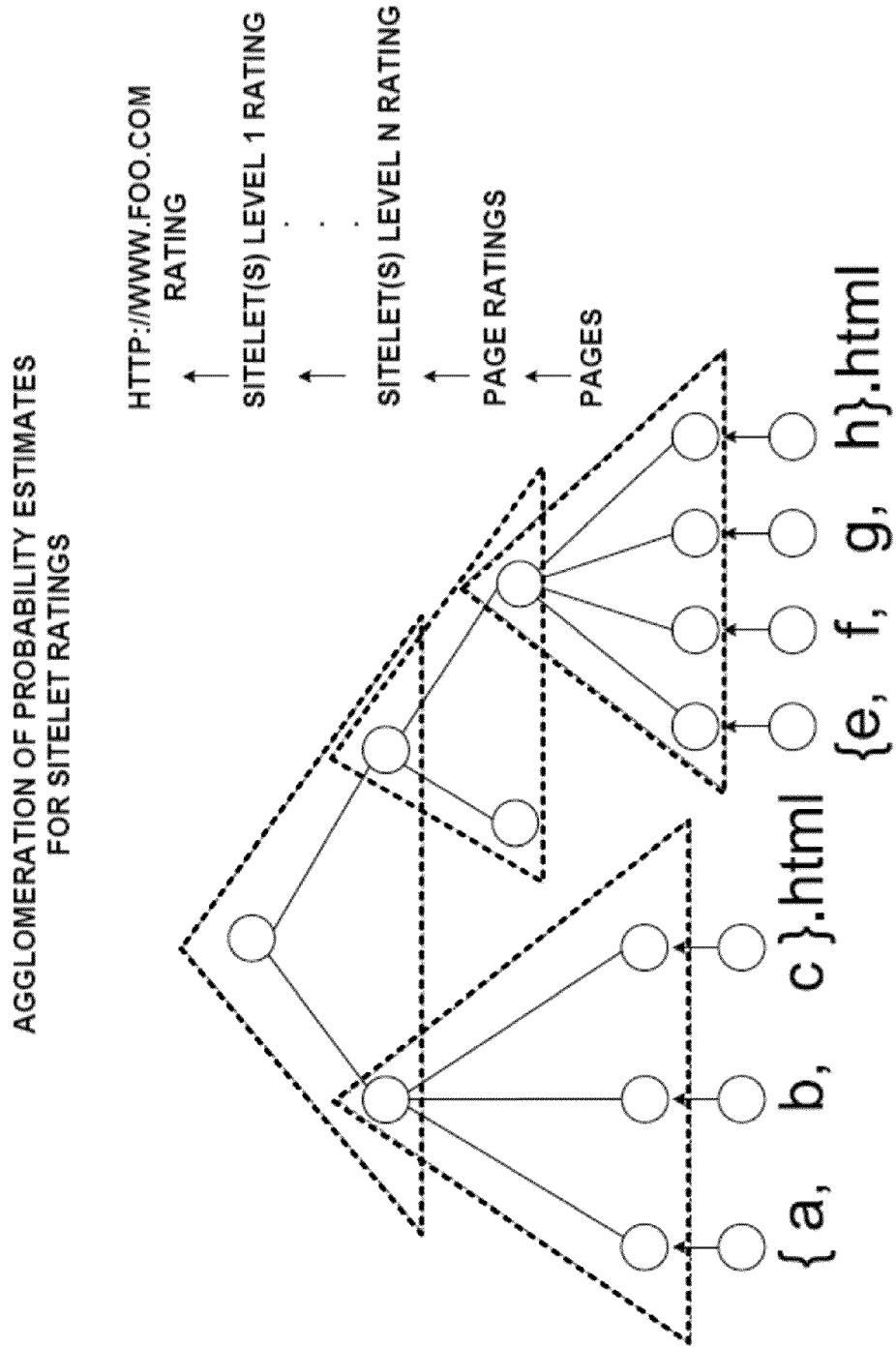
FIG. 9 is an illustrative example of calculating sitelet ordinomials in accordance with some embodiments of the disclosed subject matter.

FIG. 9 shows an illustrative example of calculating sitelet ordinomials in accordance with some embodiments of the disclosed subject matter. As shown, for calculating the aggregated sitelet ordinomial, the pages in the sitelet can be considered as a large set, or the tree structure can be taken into account explicitly. In the latter case, the calculation can be done efficiently by recursion. The base step is to calculate the rating at the root node. Then, for each step, the ratings for all the children are calculated. For each child, the inequality $|\mathcal{R}(p) - \mathcal{R}(c)| \geq \tau$ is evaluated. It should be noted that, in this embodiment, p represents the most closely neighboring super-node in the file tree to c that has been isolated as a sitelet and given an explicitly stored rating. Children that return true for this inequality are stored explicitly as their own sitelet and subjected to further recursion.

Figure 10:
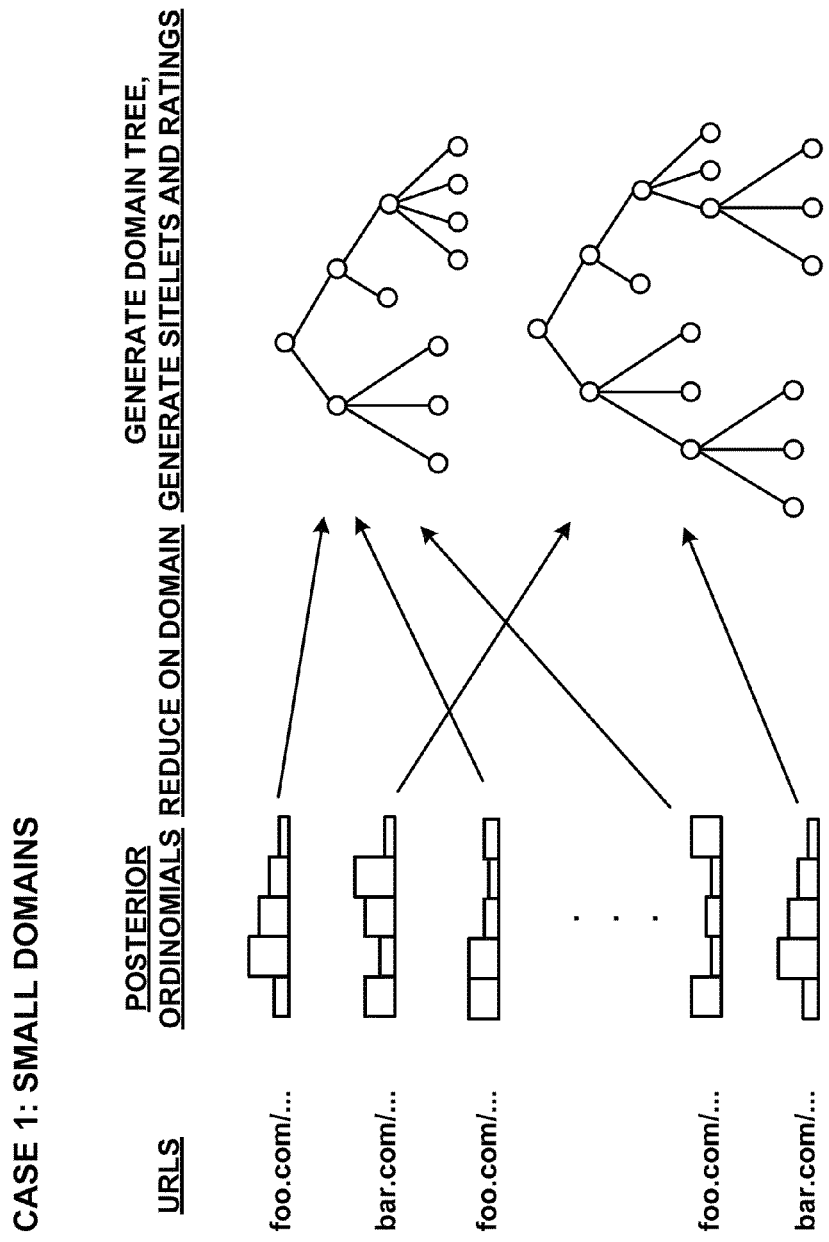
FIG. 10 is an illustrative example of calculating sitelet ordinomials and sitelet ratings in settings with small domains in accordance with some embodiments of the disclosed subject matter.

In some embodiments, sitelet ordinomials can be efficiently calculated using a map reduction process in accordance with some embodiments of the disclosed subject matter. For example, as shown in FIG. 10, in settings with small domains (e.g., those where processing can occur comfortably in a single reducer machine), the rating application can generate ratings using a single pass via MapReduce or any other suitable mapping approach. The reduction phase is performed using the domain as a key. Once the URLs belonging to a domain are assembled together, a file tree or domain tree can be generated, and the above-mentioned calculation of sitelet ordinomials can be used to find pertinent ratings in a domain.

Figure 11:
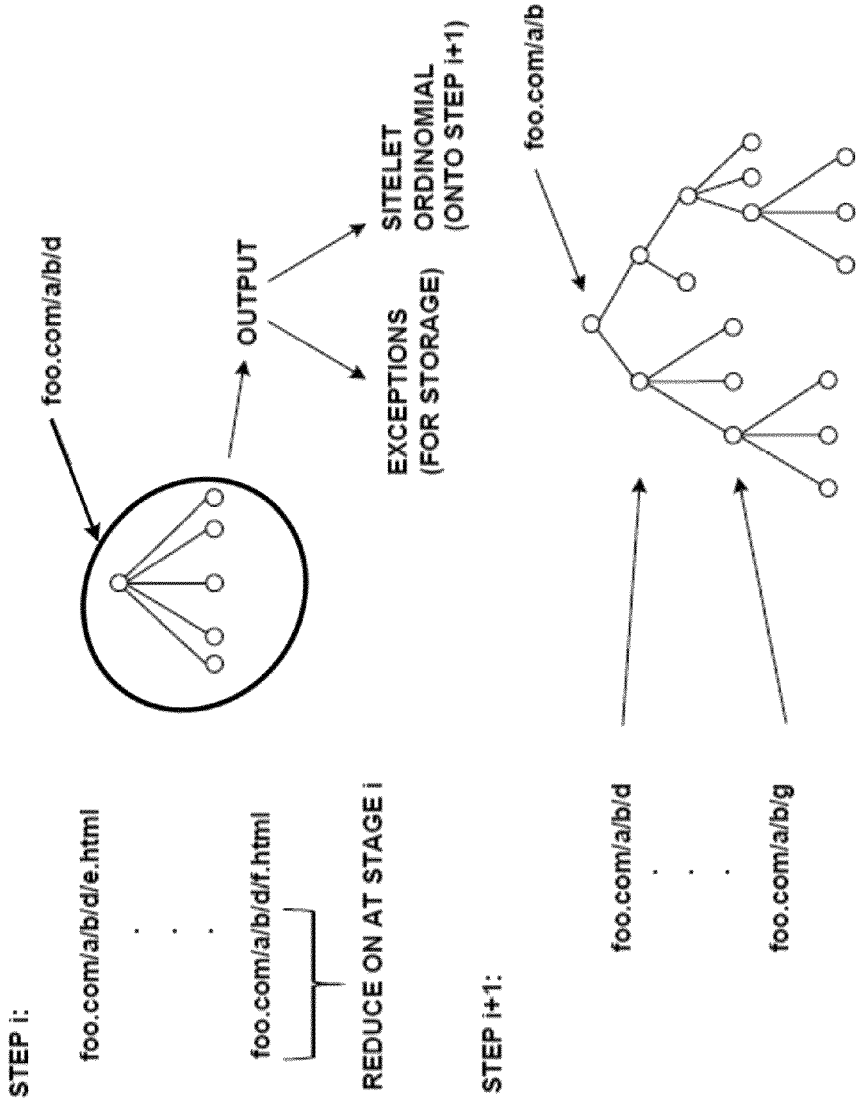
FIG. 11 is an illustrative example of calculating sitelet ordinomials and sitelet ratings in settings with larger domains in accordance with some embodiments of the disclosed subject matter.

Alternatively, FIG. 11 shows that sitelet ordinomials can be efficiently calculated using a map reduction process for settings with larger domains. In such cases, the reduction via MapReduce can occur iteratively. Let M denote the number of suffixes in the largest domain. Then for t from M to 1, combine all ordinomials at level t in accordance to the inequality $|\mathcal{R}(p) - \mathcal{R}(c)| \geq \tau$. In cases where the inequality returns false, all children are stored for rating and sitelet computation at higher levels. This may lead to an unacceptable demand for memory and resources. To alleviate this demand, children with the same or very similar ratings can be combined using explicit combination functions, for example, Bayesian or weighted averaging. Those children that have a difference in rating of at least $\tau$ are stored explicitly as their own sitelet rating. Each step reduces t by one: $t \leftarrow t-1$. This is repeated until t is equivalent to 1, where the rating and sitelet are calculated and stored to ensure all URLs present in a domain receive some rating.

Figure 12:
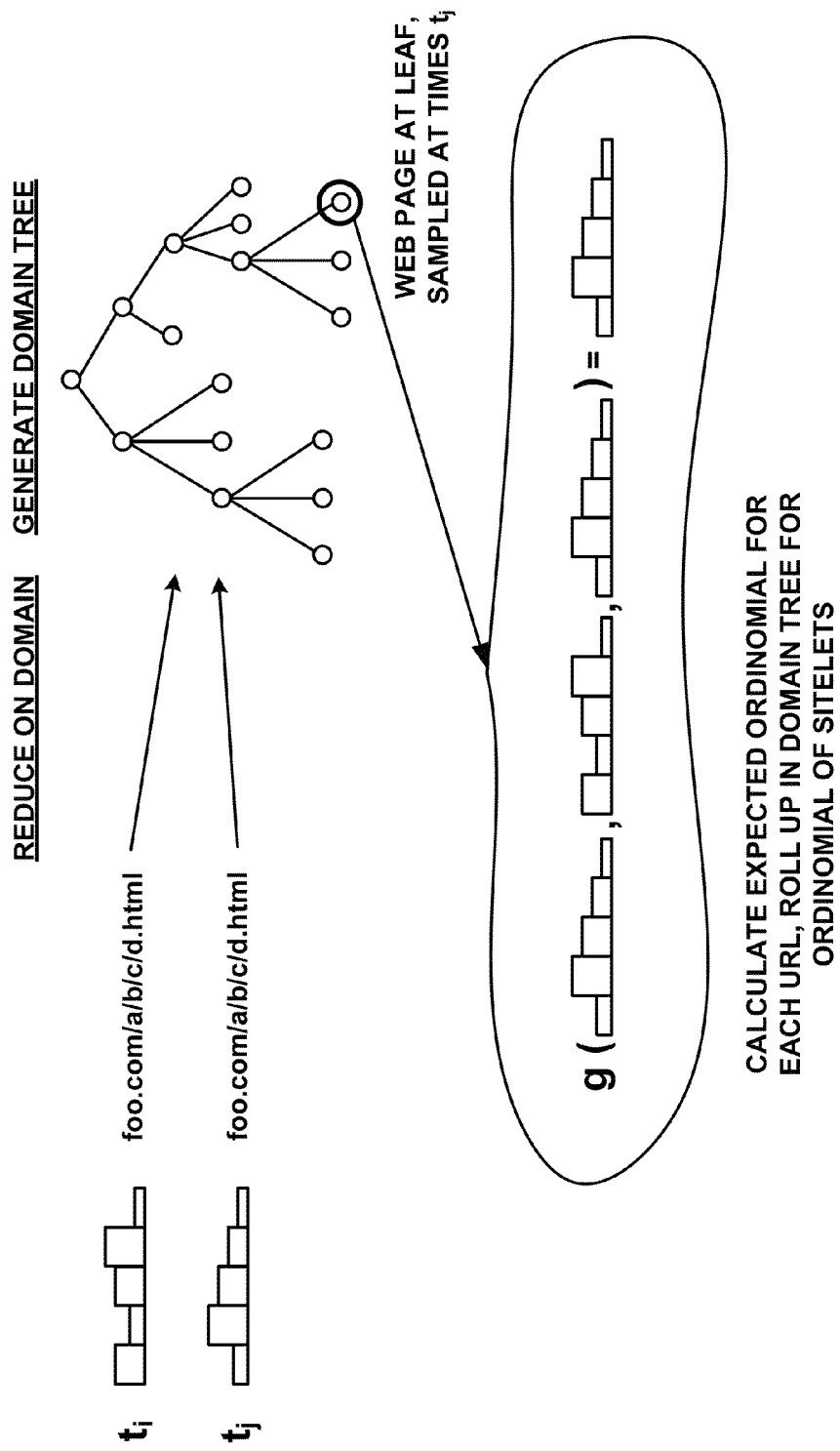
FIG. 12 is an illustrative example of using the rating application to calculate ratings using both temporal aggregation and sitelet aggregation in accordance with some embodiments of the disclosed subject matter.

In some embodiments, the rating application can calculate ratings using both temporal aggregation and sitelet aggregation. Generally speaking, the rating application accomplishes this by performing the temporal aggregation on URLs at the first step of sitelet aggregation. For example, as shown in FIG. 12, the rating application can aggregate posterior ordinomials for all times (t), a reduction phase is performed using the domain as a key, and, once the URLs belonging to a domain are assembled together, a file tree or domain tree can be generated. The expected ordinomial for each URL can then be calculated.

In accordance with some embodiments of the disclosed subject matter, mechanisms are provided for evaluating the quality of collections of online media and other suitable content. Because online media is often purchased by advertisers at different levels of granularity (e.g., ranging from individual pages to large sets of domains), it is desirable to develop metrics for comparing the quality of such diverse sets of content. More particularly, these mechanisms, among other things, collect individual content ratings, aggregate these ratings across arbitrary subsets, normalize these ratings to be on a general index scale, and calibrate the normalized ratings such that the global mean provides a benchmark for comparison.

Generally speaking, the application calculates several metrics for particular content (e.g., media, web pages, etc.). For example, in the case of objectionable content, a category can have metrics encapsulating the risk related to the appearance of adult content, metrics encapsulating the risk related to the appearance or use of hate speech, etc. Accordingly, in some embodiments, the application can provide a single metric encapsulating the different aspects of the content.

For example, let $x_j$ refer to an individual example of a piece of online media or online content, such as a particular web page, video, or image. Given multiple risk ratings for the piece of content $x_j$—e.g., $r^{(1)}(x_j), \ldots, r^{(M)}(x_j)$ for 1 through M different categories of objectionable content, the multiple risk ratings can be combined into a single concise metric, $r(x_j)$, using, for example, a specialized combination function, h, such that:

$$r(x_j) = h(r^{(1)}(x_j), \ldots, r^{(M)}(x_j))$$

In a more particular example, example combination functions include weighted averaging, where the weights are set to the importance of particular objectionable content categories, Bayesian mixing, a secondary combining model, and/or a simple minimum function that determines the most risky category in the case of a brand safety model. As described above, multiple combining functions can also be used and aggregated to create the single concise metric.

The single concise metric can, for example, be used to compare diverse sets of content. In a more particular example, the application can allow the advertiser to compare the content management by two different advertising networks.

Note that, in some embodiments, $r(\bullet)$ can be ordinal, where $r(\bullet) \in \{V_0, \ldots, V_d\}$, such that without loss of generality, $V_0 < V_1 < \ldots < V_d$. Additionally or alternatively, the ratings $r(\bullet)$ can also be real-valued, where $(\bullet) \in \mathbb{R}$. As used herein, $r(x_j)$ can provide a measure that includes both the quality (or severity) of $x_j$, and the confidence that $x_j$ deserves that level of quality. That is, the rating application can provide a rating $r(\bullet)$ that combines both the likelihood and the severity of content considered.

Generally speaking, online media is often packaged into arbitrary collections when being traded in the online advertising marketplace. Additionally, natural boundaries may exist, segregating a collection of content into distinct subsets. Given a rating defined on individual examples in this content space, $r(\bullet)$, it can be desirable to combine the ratings on individual pages into aggregate ratings denoting the expected rating of an entire subset of content. Let X denote a collection of media, for example, the media holdings of an online publisher having a particular category of web pages, such as pages related to sports, of the pages offered by a supply-side advertising network, including any subsets thereof. The rating application can aggregate the ratings of content in this collection, $x \in X$.

For ordinal ratings, the aggregation of ratings can be expressed as:

$$r_{agg} = \mathrm{argmax}_V \sum_{x \in X} \Pi(r(x) = V).$$

It should be noted that, in the above-mentioned equation, $\mathbb{I}(\bullet)$ is an indicator function that takes the value 1 when the operand is true, and zero otherwise. This corresponds to the most common ordinal value in the collection. It should also be noted that ties may be broken arbitrarily, for example, by choosing the most severe category in the tie, for safety.

For real-value ratings, the aggregation of ratings can be expressed as:

$$r_{agg} = \frac{1}{|X|} \sum_{x \in X} r(x).$$

It should be noted that, in the above-mentioned equation, $|X|$ is the number of examples in X. It should also be noted that aggregation corresponds to the arithmetic mean of individual content ratings.

When aggregating content ratings, the rating application considers that content may be presented in a pre-aggregated form. For example, the input may be domains, each with an aggregate rating. Formally, let $Y_l$ be a collection of one or more examples of content, $x \in Y_l$. Let X then be extended to be a collection of such collections, $Y_l \in X$. Rating aggregation can then be extended to such sub-aggregations of content.

For ordinal ratings, the aggregation of ratings can be expressed as:

$$r_{agg} = \mathrm{argmax}_V \sum_{Y_l \in X} |Y_l| \Pi(r_{agg}(Y) = V),$$

where $|Y|$ is the number of examples in Y.

For real-value ratings, the aggregation of ratings can be expressed as:

$$r_{agg} = \frac{1}{|X|} \sum_{Y_l \in X} |Y_l| r_{agg}(Y),$$

where $|X|$ is extended to be $\sum_{Y_l \in X} \sum_{x \in Y_l} \mathbb{I}(x \in Y_l)$, the count of all examples in all subsets.

It should be noted that the aggregate ratings on pre-collected online media are recursive. That is, content ratings can be aggregated on collections of collections of collections, etc.

In some embodiments, the rating application takes unconstrained, real-valued ratings and projects them onto a bounded region of the number line for ease of comparison. This mapping to the number value assigned to each ordinal category can be constructed to capture the risk and severity profiles of content in each respective category.

For example, the rating application can be configured to define an index-scaled rating to be a numerical rating assigned to online media constrained to the range $r_i(x) \in [\alpha, \beta]$. This rating is assumed to capture both the severity and risk of appearance of online media, with $r_i(x_j) \geq r_i(x_k)$ implying that $x_k$ is at least a risky as $x_j$—there is a greater chance of riskier content appearing on $x_k$ than on $x_j$. This implies that xj is likely to be safer for brand advertisers or other online media buyers. The values of $\alpha$ and $\beta$ can be set arbitrarily. For example, $\alpha=0$ and $\beta=200$ can be provided for the scale.

Given an index-scaled rating, $r_i(x)$, on a particular example x, the rating application defines a mapping from an unsealed rating to a scaled rating for both ordinal and real-valued ratings into $r_i(x)$.

For ordinal ratings, the index-scaled rating can be expressed as:

$$r_i(x_j) = a_{r(x_j)}$$

It should be noted that the mapping to an index-scaled rating is performed by assigning a constant, a, to each ordinal non-index scaled rating. As mentioned above, in the ordinal setting, $r(\bullet) \in \{V_0, \ldots, V_d\}$. Here, as each $a \in [\alpha, \beta]$ (e.g., a is bounded by the index-scaled rating range and without loss of generality $a_{V_m} < a_{V_n}$ whenever $V_m < V_n$), more risky ordinal categories have lower numerical values in the mapping.

For real-valued ratings, the index-scaled rating can be expressed as:

$$r_i(x_j) = f(r(x_j))$$

Here, $f(\bullet)$ is a monotonic function. For example, $f(x_j) \leq f(r(x_k))$ whenever $r(x_j) \leq r(x_k)$. That is, lower unscaled ratings tend to get lower scaled ratings. Additionally, it should be noted that, the range of $f(\bullet)$ is $[\alpha, \beta]$.

Accordingly, the rating application can transform arbitrary raw ratings into an index-scaled rating. Such a numerical rating can encode the likelihood of encountering risky or inappropriate content on a given example of online media, in addition to the likely severity of such content. The resulting index-scaled rating represents the value of online content to buyers and advertisers, with risky and severely inappropriate content generally being of low value.

Because a single example of an advertisement appearing on severely inappropriate content (e.g., pornography or hate speech) may have harsh consequences for the advertiser placing the advertisement, individual examples of inappropriate content may have a disproportionate influence in the aggregate rating of collected content. That is, even a few severely inappropriate pages in a site containing thousands of examples may bring the aggregate rating down significantly. In order to capture this disproportionate influence of inappropriate content, the rating application can be configured to aggregate ratings for collected content, $x \in Xm$ with commensurate impact of riskier individual pages. This can be represented as follows:

$$r_{i,agg} = \frac{\sum_{x \in X} r_i(x)}{\sum_{x \in X} w(r_i(x))}$$

It should be noted that $w(\bullet) \in [1, \infty)$ represents a weight function associated with a content rating. More particularly, content that is riskier receives both a lower numerical rating and contributes to a higher total weight, thereby lowering the expected score via a lower denominator. For example, assume that the rating application creates four risk buckets—e.g., very high risk, high risk, moderate risk, and low risk, each with ranges of an index-scaled rating. For a given aggregation of content, the rating application also denotes the number of examples in each by $r_1$, $r_2$, $r_3$, and $r_4$, respectively. The rating application can also assign a native index-scaled rating to each bucket. For example, the rating application can assign 50, 100, 150, and 200 to each bucket, respectively. In addition, the rating application can provide combination weights for each category. For example, the application can assign the combination weights of 35.2, 8.8, 2.2, and 1.0 for each bucket, respectively. Accordingly, a severity weight aggregation of such content can be determined by calculating:

$$r_{i,agg} = \frac{50r_1 + 100r_2 + 150r_3 + 200r_4}{35.2r_1 + 8.8r_2 + 2.2r_3 + 1.0r_4}$$

In some embodiments, the rating application not only considers how a content rates with respect to risk and severity, but also determines how that content compares to other similar content. In order to perform such a comparison, the rating application recalibrates ratings to the mean rating of content being considered. The mean ($\mu_r$) of the uncalibrated set of ratings can be determined by calculating:

$$\mu_r = \frac{1}{|X|} \sum_{x \in X} r_i(x)$$

It should be noted that gamma ($\gamma$) can denote a value that the mean is mapped after calibration and $Y_j$ can denote a subset of content in X. The rating application then defines a calibration of $Y_j$'s rating, $r_c$ relating to $\mu_r$ using the following cases:

$$r_c(Y_j) = \begin{cases} \gamma & \text{if } r_{i,agg}(Y_j) = \mu_r \\ \gamma \frac{r_{i,agg}(Y_j) - \alpha}{\mu_r} + \alpha & \text{if } r_{i,agg}(Y_j) < \mu_r \\ \gamma \frac{r_{i,agg}(Y_j) - \gamma}{\mu_r} + \gamma & \text{if } r_{i,agg}(Y_j) > \mu_r \end{cases}$$

For example, in the above-mentioned case, where $\alpha=0$ and $\beta=200$ and let $\gamma=100$. The re-calibration can be performed by determining:

$$r_c(Y_j) = \begin{cases} 100 & \text{if } r_{i,agg}(Y_j) = \mu_r \\ 100 \frac{r_{i,agg}(Y_j)}{\mu_r} & \text{if } r_{i,agg}(Y_j) < \mu_r \\ 100 \frac{r_{i,agg}(Y_j) - 100}{\mu_r} + 100 & \text{if } r_{i,agg}(Y_j) > \mu_r \end{cases}$$

Figure 13:
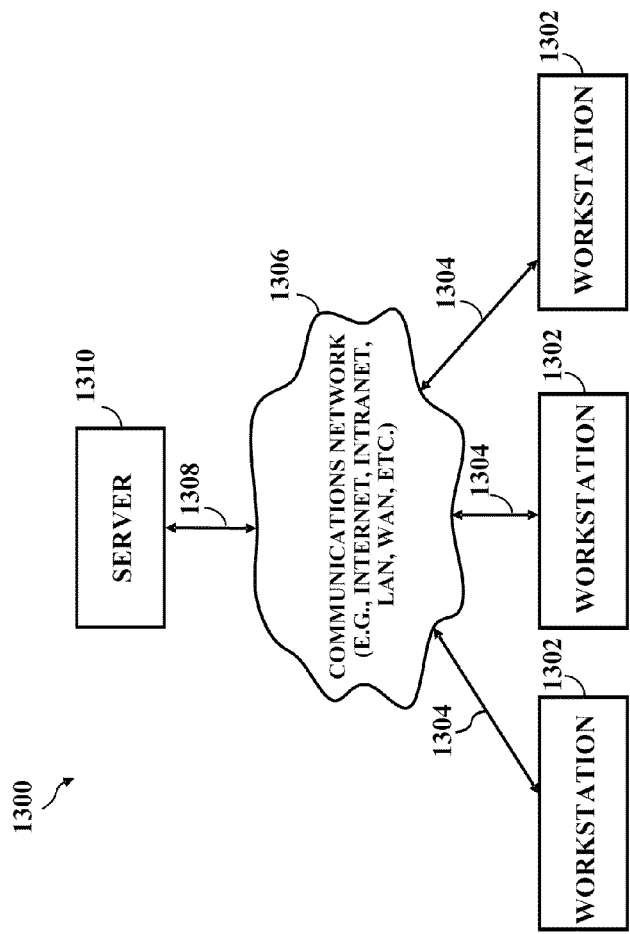
FIG. 13 is a diagram of an illustrative system on which a rating application can be implemented in accordance with some embodiments of the disclosed subject matter.

FIG. 13 is a generalized schematic diagram of a system 1300 on which the rating application may be implemented in accordance with some embodiments of the disclosed subject matter. As illustrated, system 1300 may include one or more user computers 1302. User computers 1302 may be local to each other or remote from each other. User computers 1302 are connected by one or more communications links 1304 to a communications network 1306 that is linked via a communications link 1308 to a server 1310.

System 1300 may include one or more servers 1310. Server 1310 may be any suitable server for providing access to the application, such as a processor, a computer, a data processing device, or a combination of such devices. For example, the application can be distributed into multiple backend components and multiple frontend components or interfaces. In a more particular example, backend components, such as data collection and data distribution can be performed on one or more servers 1310. Similarly, the graphical user interfaces displayed by the application, such as a data interface and an advertising network interface, can be distributed by one or more servers 1310 to user computer 1302.

More particularly, for example, each of the client 1302 and server 1310 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client 1302 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 13, communications network 1306 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 1304 and 1308 may be any communications links suitable for communicating data between user computers 1302 and server 1310, such as network links, dial-up links, wireless links, hard-wired links, any other suitable communications links, or a combination of such links. User computers 1302 enable a user to access features of the application. User computers 1302 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. User computers 1302 and server 1310 may be located at any suitable location. In one embodiment, user computers 1302 and server 1310 may be located within an organization. Alternatively, user computers 1302 and server 1310 may be distributed between multiple organizations.

Figure 14:
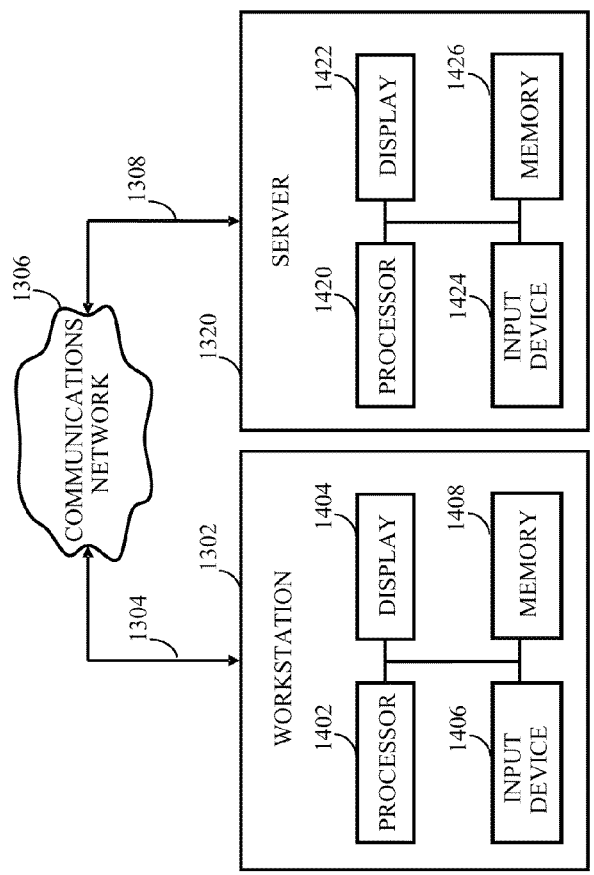
FIG. 14 is a diagram of an illustrative user computer and server as provided, for example, in FIG. 13 in accordance with some embodiments of the disclosed subject matter.

Referring back to FIG. 13, the server and one of the user computers depicted in FIG. 13 are illustrated in more detail in FIG. 14. Referring to FIG. 14, user computer 1302 may include processor 1402, display 1404, input device 1406, and memory 1408, which may be interconnected. In a preferred embodiment, memory 1408 contains a storage device for storing a computer program for controlling processor 1402.

Processor 1402 uses the computer program to present on display 1404 the application and the data received through communications link 1304 and commands and values transmitted by a user of user computer 1302. It should also be noted that data received through communications link 1304 or any other communications links may be received from any suitable source. Input device 1406 may be a computer keyboard, a cursor-controller, dial, switchbank, lever, or any other suitable input device as would be used by a designer of input systems or process control systems.

Server 1310 may include processor 1420, display 1422, input device 1424, and memory 1426, which may be interconnected. In a preferred embodiment, memory 1426 contains a storage device for storing data received through communications link 1308 or through other links, and also receives commands and values transmitted by one or more users. The storage device further contains a server program for controlling processor 1420.

In some embodiments, the application may include an application program interface (not shown), or alternatively, the application may be resident in the memory of user computer 1302 or server 1310. In another suitable embodiment, the only distribution to user computer 1302 may be a graphical user interface ("GUI") which allows a user to interact with the application resident at, for example, server 1310.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Accordingly, methods, systems, and media for applying scores and ratings to web pages, web sites, and other pieces of content of interest to advertisers or content providers for safe and effective online are provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for rating webpages for safe advertising, the method comprising:
   extracting one or more features from a piece of web content;
   applying, using a hardware processor, a plurality of statistical models to the extracted features to generate a plurality of ordinomial estimates, wherein each ordinomial estimate represents a probability that the web content is a member of one of a plurality of severity groups;
   determining a posterior ordinomial estimate for the web content by combining the plurality of ordinomial estimates;
   generating a risk rating that encodes severity and confidence based on the determined posterior ordinomial estimate, wherein the risk rating identifies whether the web content is likely to contain objectionable content of a given category; and
   providing the risk rating for determining whether an advertisement should be associated with the web content.

2. The method of claim 1, further comprising:
   determining a plurality of posterior ordinomial estimates at a plurality of times for the web content; and
   determining an expected posterior ordinomial estimate by combining the plurality of posterior ordinomial estimates over the plurality of times.

3. The method of claim 2, further comprising:
   extracting a uniform resource locator from the one or more features;
   assembling a first set of posterior ordinomial estimates from the plurality of posterior ordinomial estimates based on the uniform resource locator; and
   determining the expected posterior ordinomial estimate by combining the first set of posterior ordinomial estimates over the plurality of times.

4. The method of claim 2, further comprising determining that the web content belongs to a sitelet, wherein the sitelet includes a plurality of web pages.

5. The method of claim 4, further comprising:
   determining a sitelet ordinomial by aggregating the plurality of posterior ordinomial estimates associated with each of the plurality of web pages; and
   generating a sitelet rating based on the aggregated plurality of posterior ordinomials.

6. The method of claim 5, further comprising:
   comparing the sitelet ordinomial with the plurality of posterior ordinomial estimates associated with each of the plurality of web pages belonging to the sitelet; and
   determining whether to store at least one of the sitelet ordinomial and the plurality of posterior ordinomial estimates based on the comparison and a sensitivity value.

7. The method of claim 1, further comprising:
   collecting a plurality of ratings associated with a plurality of pieces of web content, wherein the plurality of ratings includes ordinal ratings and real-valued ratings; and
   determining an aggregate rating for the plurality of pieces of web content based on the collected plurality of ratings.

8. The method of claim 7, further comprising normalizing the aggregate rating by mapping the aggregate rating to an index-scaled rating.

9. The method of claim 8, further comprising:
   applying a severity weight to the index-scaled rating; and
   generating a severity-weighted index-scaled rating for the plurality of pieces of web content.

10. The method of claim 1, further comprising generating a combined risk rating by combining the generated risk rating that encodes whether the web content is likely to contain objectionable content of the given category with a second risk rating that encodes whether the web content is likely to contain objectionable content of a second category.

11. A system for rating webpages for safe advertising, the system comprising:
    a processor that:
        extracts one or more features from a piece of web content;
        applies a plurality of statistical models to the extracted features to generate a plurality of ordinomial estimates, wherein each ordinomial estimate represents a probability that the web content is a member of one of a plurality of severity groups;
        determines a posterior ordinomial estimate for the web content by combining the plurality of ordinomial estimates;
        generates a risk rating that encodes severity and confidence based on the determined posterior ordinomial estimate, wherein the risk rating identifies whether the web content is likely to contain objectionable content of a given category; and
        provides the risk rating for determining whether an advertisement should be associated with the web content.

12. The system of claim 11, wherein the processor is further configured to:
    determine a plurality of posterior ordinomial estimates at a plurality of times for the web content; and
    determine an expected posterior ordinomial estimate by combining the plurality of posterior ordinomial estimates over the plurality of times.

13. The system of claim 12, wherein the processor is further configured to:
    extract a uniform resource locator from the one or more features;
    assemble a first set of posterior ordinomial estimates from the plurality of posterior ordinomial estimates based on the uniform resource locator; and
    determine the expected posterior ordinomial estimate by combining the first set of posterior ordinomial estimates over the plurality of times.

14. The system of claim 12, wherein the processor is further configured to determine that the web content belongs to a sitelet, wherein the sitelet includes a plurality of web pages.

15. The system of claim 14, wherein the processor is further configured to:
    determine a sitelet ordinomial by aggregating the plurality of posterior ordinomial estimates associated with each of the plurality of web pages; and generate a sitelet rating based on the aggregated plurality of posterior ordinomials.

16. The system of claim 15, wherein the processor is further configured to:
    compare the sitelet ordinomial with the plurality of posterior ordinomial estimates associated with each of the plurality of web pages belonging to the sitelet; and
    determine whether to store at least one of the sitelet ordinomial and the plurality of posterior ordinomial estimates based on the comparison and a sensitivity value.

17. The system of claim 11, wherein the processor is further configured to:
    collect a plurality of ratings associated with a plurality of pieces of web content, wherein the plurality of ratings includes ordinal ratings and real-valued ratings; and
    determine an aggregate rating for the plurality of pieces of web content based on the collected plurality of ratings.

18. The system of claim 17, wherein the processor is further configured to normalize the aggregate rating by mapping the aggregate rating to an index-scaled rating.

19. The system of claim 18, wherein the processor is further configured to:
    apply a severity weight to the index-scaled rating; and
    generate a severity-weighted index-scaled rating for the plurality of pieces of web content.

20. The system of claim 11, wherein the processor is further configured to generate a combined risk rating by combining the generated risk rating that encodes whether the web content is likely to contain objectionable content of the given category with a second risk rating that encodes whether the web content is likely to contain objectionable content of a second category.

21. A non-transitory computer-readable medium containing computer-executable instructions that, when executed by a processor, cause the processor to perform a method for rating webpages for safe advertising, the method comprising:
    extracting one or more features from a piece of web content;
    applying a plurality of statistical models to the extracted features to generate a plurality of ordinomial estimates, wherein each ordinomial estimate represents a probability that the web content is a member of one of a plurality of severity groups;
    determining a posterior ordinomial estimate for the web content by combining the plurality of ordinomial estimates;
    generating a risk rating that encodes severity and confidence based on the determined posterior ordinomial estimate, wherein the risk rating identifies whether the web content is likely to contain objectionable content of a given category; and
    providing the risk rating for determining whether an advertisement should be associated with the web content.

* * * * *